UNITED STATES PATENT OFFICE.

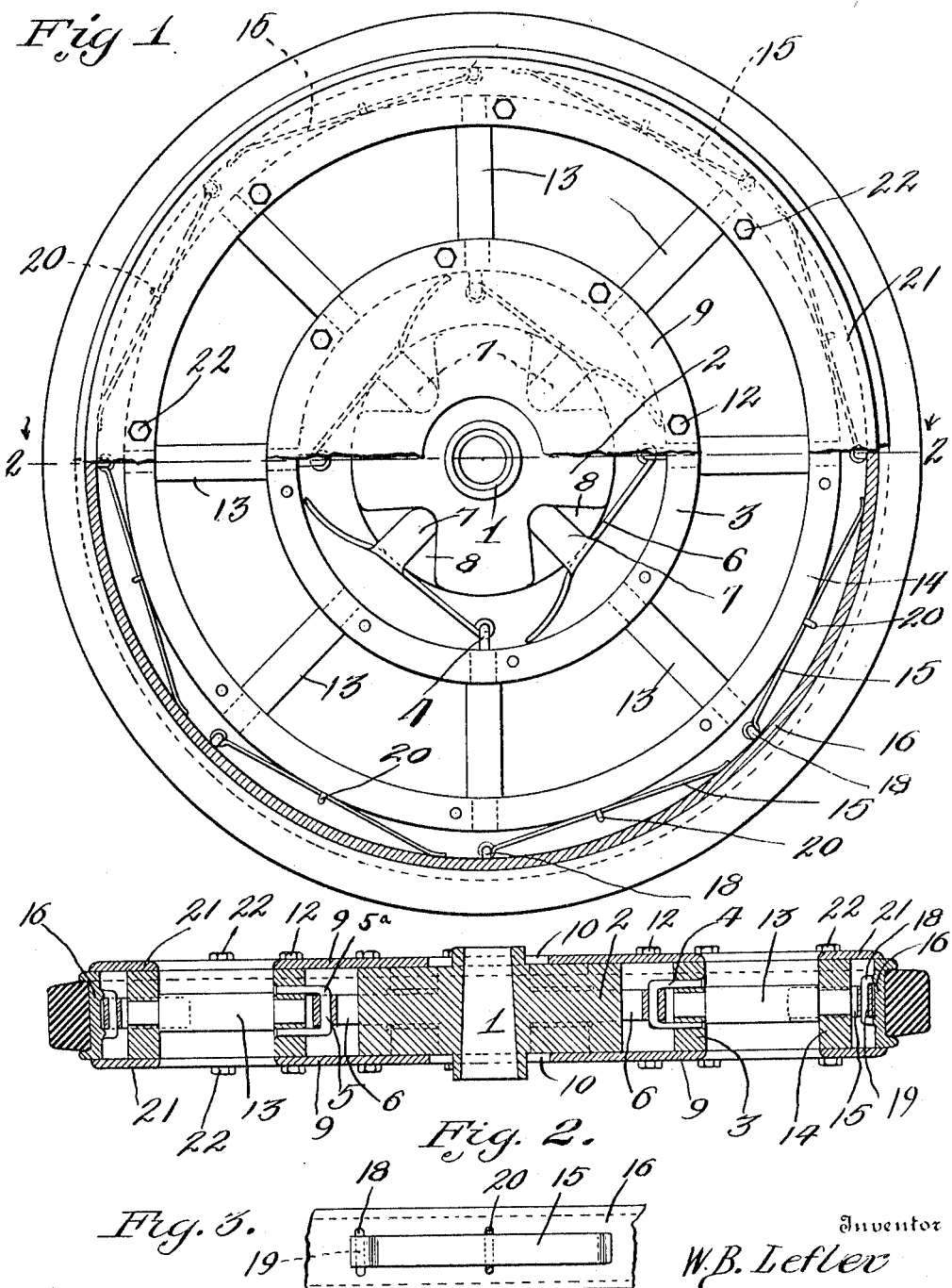

WILLIAM B. LEFLER, OF SPRINGFIELD, NEBRASKA.

SPRING-WHEEL.

1,118,502.   Specification of Letters Patent.   Patented Nov. 24, 1914.

Application filed June 1, 1914. Serial No. 842,240.

*To all whom it may concern:*

Be it known that I, WILLIAM B. LEFLER, a citizen of the United States, residing at Springfield, in the county of Sarpy and State of Nebraska, have invented a new and useful Spring-Wheel; and I do hereby declare the following to be a full, clear, and exact description of the invention, such as will enable others skilled in the art to which it appertains to make and use the same.

This invention relates to an improved resilient wheel, and an object in view is the provision of an inner hub rim having four flat springs, to yieldably support the hub proper, said hub rim having spoke connections with a second rim adjacent the tire or felly rim, between which felly rim and the second rim series of flat springs are interposed, there being means to hold the second rim in engagement with the series of springs and similar means carried by the afore-mentioned springs to hold the hub in place.

In practical fields the details of construction may be subjected to alterations falling within the scope of what is claimed.

The invention comprises further features and combinations of parts as hereinafter set forth, shown in the drawings and claimed.

In the drawings, Figure 1 is a view, partly in elevation, and showing parts broken away, showing the features of construction of the wheel. Fig. 2 is a sectional view on line 2—2 of Fig. 1. Fig. 3 is a detail view of one of the flat springs and its connections with the second rim adjacent the felly rim.

Referring to the drawings, 1 designates the hub proper having an annular flange 2 of considerable thickness. Surrounding the hub proper is a hub rim 3 and spaced apart from the annular flange. Upon the hub rim are U-shaped members 4 having cylindrical portions 5. Flat springs 6 are provided, one end of each of which is coiled about the cylindrical portion 5 of each U-shaped member 5ª, and arranged as shown in the drawings, so that the peripheral edge of the flange 2 will engage said springs, thereby yieldably mounting the hub member proper. The U-shaped members 5ª are carried by the hub rim 3. The opposite edges of the springs 6 are provided with lugs 7 to engage the angular recesses 8 of the flange 2, so as to hold the flange in position relative to the said springs. These recesses are large enough to permit movement of the hub member, especially when the hub member is acting upon two of the springs 6 at the same time. Annular plates 9 having openings 10 to receive the opposite end portions of the hub, are bolted upon opposite sides of the rim 3, as shown at 12, thereby holding the foregoing parts properly in place. Radiating from the rim 3 are the usual spokes 13, which connect to a second rim 14, which engage the flat springs 15. A felly rim 16 is provided, which may either have a flat surface, or a convex surface, or may be grooved, to receive the usual form of tire, as shown. Upon the inner circumference of the felly rim are the U-shaped members 18 having cylindrical portions 19, about which the ends of said springs 15 are coiled, as illustrated. Each spring 15 has a free end slidably engaging the inner circumference of the felly rim, so as to permit the spring to easily yield incident to the movement of the rim 14. Staples 20 are carried by the rim 14, and arch over the springs 15, so as to hold them in place relative to said rim 14. Annular ring plates 21 are bolted to the opposite sides or faces of the rim 14, as shown at 22. These plates constitute means to hold the rim 14, as well as the foregoing attending parts, properly in position relative to the felly rim, and also act to withstand all lateral strains, and maintain the wheel stable and mobile.

The invention having been set forth, what is claimed as new and useful is:—

1. In improvements in resilient wheel construction, an outer wheel rim construction, a hub rim having connections with the outer wheel rim construction, said hub rim having radially extending staples, each having a transversely disposed cylindrical portion, a hub member proper having an annular flange, said flange upon opposite faces thereof being provided with recesses angular in side elevation, which recesses have curved crotches, a plurality of flat leaf springs, one end of each of which having a cylindrical hollow roll, which receives each cylindrical portion of each staple, said flat leaf springs midway of their length being in engagement with the flange of the hub proper, the free end of each spring engaging the inner periphery of the hub rim, said leaf spring having upon its opposite edges radially extending lugs engaging said angular recesses of the opposite faces of said flange, and a pair of disk plates secured to and carried by the opposite sides of the hub rim to engage the opposite faces of said flange, thereby holding the parts of the structure in place.

2. In a resilient wheel construction, an outer wheel rim construction, a hub rim having spoke connections with the outer wheel rim construction, said hub rim having U-shaped members provided with cylindrical portions, a plurality of flat leaf springs, one end of each of which engages the cylindrical portions of the U-shaped members, whereas the free end of each spring slidably engages the inner circumference of the hub rim, a hub member proper having an annular flange engaging said springs, the springs having oppositely arranged lugs engaging said flange on each side, and annular ring plates secured to opposite faces of the hub rim to hold said parts in their relative positions.

In testimony whereof I have signed my name to this specification in the presence of two subscribing witnesses.

WILLIAM B. LEFLER.

Witnesses:
G. A. BATES,
H. J. WEETH.

Copies of this patent may be obtained for five cents each, by addressing the "Commissioner of Patents, Washington, D. C."